(12) United States Patent
Schittl et al.

(10) Patent No.: US 6,993,435 B2
(45) Date of Patent: Jan. 31, 2006

(54) METHOD AND DEVICE FOR THE AUTOMATIC DETERMINATION OF THE DIAMETER OF A ROUND DISK-LIKE TOOL DRIVEN BY A MOTOR

(75) Inventors: Josef Schittl, Thüringen (AT); Eduard Sever, Ludesch (AT); Georg Studer, Thüringen (AT); Marcus Flock, Kaufering (DE); Guenther Veik, Maeder (AT); Roland Schaer, Grabs (CH); Christoph Würsch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 73 days.

(21) Appl. No.: 10/822,616

(22) Filed: Apr. 12, 2004

(65) Prior Publication Data

US 2005/0000333 A1 Jan. 6, 2005

(30) Foreign Application Priority Data

Apr. 14, 2003 (EP) .................................. 03405255

(51) Int. Cl.
*G01L 1/00* (2006.01)
*G01B 11/08* (2006.01)
(52) U.S. Cl. ..................... 702/41; 702/42; 702/157
(58) Field of Classification Search ................ 702/41, 702/42, 155, 157; 30/381, 392; 83/13, 38, 83/329; 173/2, 176, 181
See application file for complete search history.

(56) References Cited

U.S. PATENT DOCUMENTS

| 3,938,041 A | 2/1976 | Louth ......................... 324/772 |
| 4,820,962 A | 4/1989 | Millauer ..................... 318/602 |
| 6,200,231 B1 * | 3/2001 | Moriyama et al. .......... 473/358 |

FOREIGN PATENT DOCUMENTS

DE 4312162 10/1994

* cited by examiner

Primary Examiner—Bryan Bui
Assistant Examiner—Meagan S Walling
(74) Attorney, Agent, or Firm—Abelman, Frayne & Schwab

(57) ABSTRACT

For the automatic determination of the diameter of a tool, particularly a saw blade for an automatic wall saw, which is driven by a motor via a gear unit, the moment of inertia of the tool is used as an indicator for its diameter. Three basic solution variants are introduced. In particular, the system including a motor, gear unit and tool is treated as a dual-mass oscillator such that the elasticity of the shafts and gears is arranged as a torsion spring between the inertial masses in two discrete points while taking into account two coefficients of friction including coefficients of the known inertia of the motor rotor ($\Theta_R$) and of the tool ($\Theta_S$). This system can be described by equations which are then simplified by reasonable assumptions or premises. The selected formulations are solved for the moment of inertia of the tool to determine the diameter therefrom and to make an optimal adjustment for the drive possible which is adapted to the respective tool.

11 Claims, 5 Drawing Sheets

Figure 1:
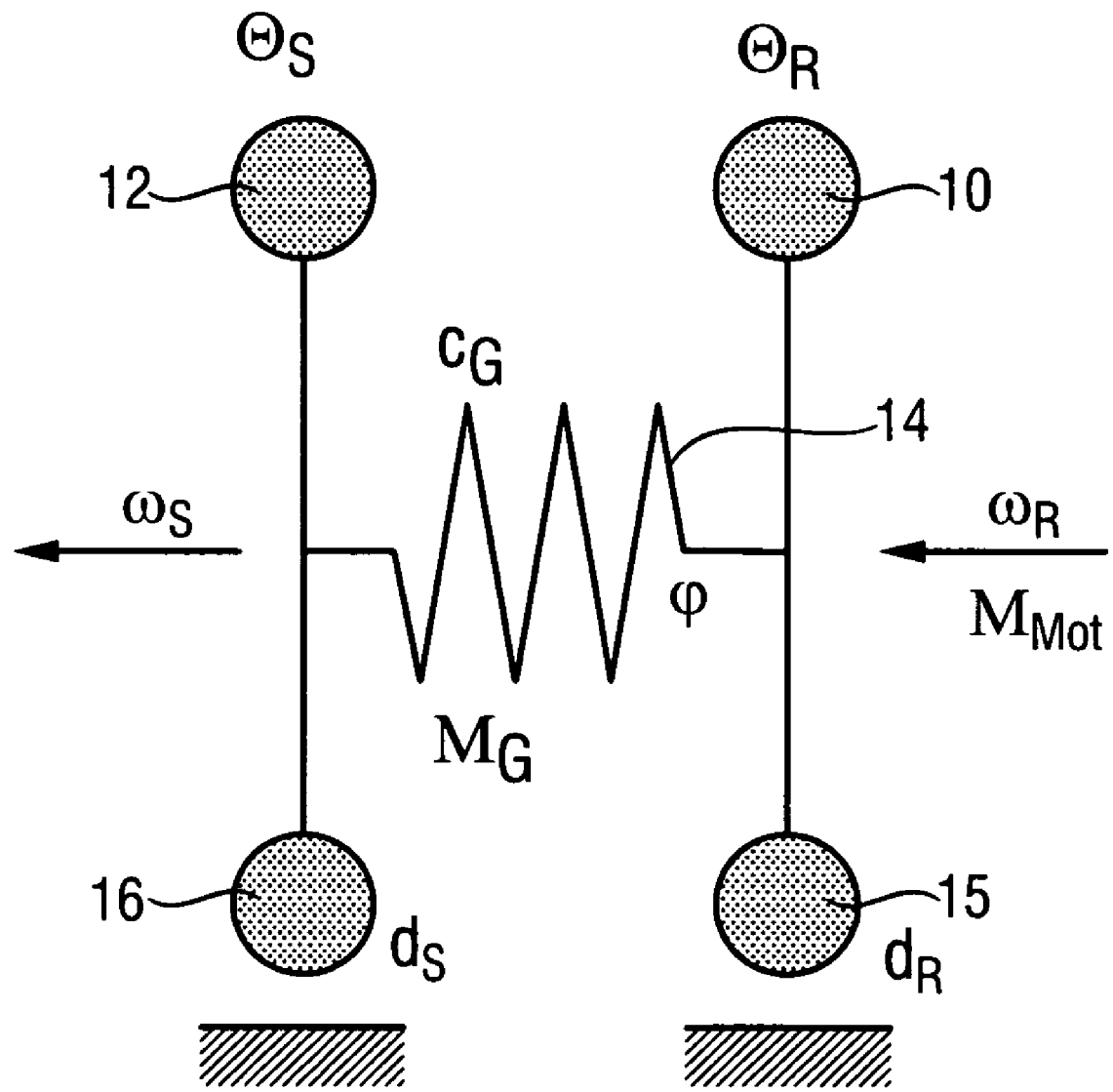

METHOD AND DEVICE FOR THE AUTOMATIC DETERMINATION OF THE DIAMETER OF A ROUND DISK-LIKE TOOL DRIVEN BY A MOTOR

BACKGROUND OF THE INVENTION

The invention is directed to a method for the automatic determination of the diameter of a round disk-like tool, particularly a saw blade for an automatic wall saw, which is driven by a motor.

The invention is further directed to a method for adjusting optimum cut parameters, particularly the cut length and cut depth, for an automatic wall saw.

An automatic wall saw is generally realized as a robot with two degrees of freedom. These degrees of freedom are the forward feed x of the drive unit on a carriage and the swiveling angle $\Phi$ of a swiveling arm which is articulated, for example, at a motor or gear unit housing, the saw blade being rotatably mounted at the free end of the swiveling arm. For an automatic sawing process in wall saws, it is necessary to know the diameter of the saw blade because the cut depth t and cut length, among others, depend on this. In addition, it is possible to adjust an optimal cutting speed when the diameter of the saw blade is known. This also applies in principle to smaller electric power tools such as circular saws, parting-off or angle grinders and the like.

It is known in electric power tools to provide the exchangeable tools with coding containing information about specific features of the tool. A readout device or sensor is associated with this coding so that selectable operating parameters of the drive unit can be optimized for the tool in question based on information specific to the tool. Different complementary pairings of coding and readout are known for this purpose, namely, mechanical, optical, magnetic, inductive or transponder-based.

For example, DE 37 20 512 A1 describes a hand-held device with a receptacle detachably connected to a drive shaft for tools whose insertion end has groove-shaped recesses engaging in radially displaceable locking elements in the tool receptacle. The locking elements are held in engagement with the tool by an actuating sleeve rotatably enclosing the tool receptacle. In order to disengage the lock, the actuating sleeve is rotated until the locking elements move radially outward into recesses in the actuating sleeve, thereby disengaging from the tool. Radially movable control elements in the tool receptacle are-arranged in a defined rotational position relative to the locking elements. Longitudinal grooves are associated with the control elements at the insertion end of the tool so that the control elements can penetrate into these longitudinal grooves in radial direction under the action of springs. Swiveling levers are associated with the control elements. These swiveling levers read off or measure the radial position of the control elements, one end of the swiveling levers being at a correspondingly changeable radial distance from a sensor which is positioned so as to be stationary in the device housing. When the tool receptacle rotates, these ends of the swiveling levers move past the sensor and therefore influence the sensor inductively. The ends of the levers can have working surfaces of different size which influence the sensors. Operating parameters of the device, e.g., the rotational speed and number of impacts in case of a drill hammer, are adjusted correspondingly to the switching signals generated in the sensor.

The subject matter of DE 37 21 771 A1 is a hand-held device which likewise has a receptacle for tools that is detachably connected to a drive shaft. The insertion end of the tools is provided with an adapted receptacle body for the tool in question, whose working diameter can vary widely. For this reason, there are commonly two different diameters for this type of insertion end. In order to be able to use all of these tools with one hand-held device, two tool receptacles which are adapted to these different diameters can be selectively exchanged for one another and connected to the drive shaft so as to be fixed with respect to rotation relative to it. The locking elements engaging in the recesses of the tools are radially displaceable by means of a locking sleeve which is rotatable or displaceable relative to the receptacle body. Control elements which are radially displaceable relative to the locking sleeve are arranged in additional openings of the receptacle body. The control elements permit a rotation or displacement of the locking sleeve in a first radial position in which they penetrate into recesses formed at the tool and in a second radial position block any such movement of the locking sleeve. The locking elements and the control elements must be removed from the cross section intended for receiving the respective insertion end of the tools in order for a tool to be inserted into the receptacle, so that the locking sleeve is moved against a returning or restoring force until the locking elements and the control elements can move radially outward so as to snap into a widened area of the locking sleeve. When the tool is completely inserted into the tool receptacle, the locking sleeve is released and moves in the direction of its rest position under the action of the returning force.

Due to the great variety of working diameters of the tools that can be used with a tool receptacle of this kind, it is desirable to adapt the device to the capabilities of each tool. For this purpose, the locking sleeve and the device housing are provided with sensor elements which are associated with one another and which cooperate to adjust the device to the capacity suited to the tool as soon as the locking sleeve is in its rest position. There is no tool-specific adjustment of capacity at the device when tools not having these recesses associated with the control elements are inserted into the tool receptacle. In that case, the device is operated with a standardized operating characteristics setting. To enable diverse adjustments, a plurality of sensors can also be provided in combination with a plurality of control elements at the receptacle body and a plurality of recesses which are associated with the latter can be provided in the tool. Accordingly, the technical expenditure for this tool-oriented adjustment of the device is considerable.

DE 36 37 128 A1 describes an automatic, tool-specific adjustment of the operating characteristics of an electric drive device for exchangeable tools in which tool-specific data marks are arranged on the tool shaft to be uniformly distributed over its circumference. These data marks cooperate with a reading device which is built into the tool receptacle of the drive device to be fixed with respect to the device housing, such that when there is relative movement between the tool and work device the reading device generates an electric signal which adjusts the drive device to operating parameters corresponding to the tool by an electronic evaluating device. The data marks can comprise a sequence of notch-like recesses which are distributed over the circumference of the shaft and separated by webs that are left on the shaft diameter resulting in at least one data track comprising a sequence of associated recesses and webs with which, for example, an inductive sensor or an optical sensor in the reading device is associated.

A machine tool according to DE 196 29 623 A1 has a tool spindle with a receptacle for a rotary tool. A multispeed shifting device transmits the rotation of a drive shaft to the tool spindle in a rotational speed ratio that is determined by the effective gear in each instance. The rotary tool is provided with a code which can be sensed mechanically and which indicates a desired operating speed of the tool spindle. The code is sensed by a switching mechanism of the shifting gear unit such as a feeling pin guided axial to the tool spindle, such that there is no need for the user of the machine to be informed about the desired rotational speed and to adjust the machine correspondingly.

According to DE 43 12 162, an electric power tool, particularly for sawing, grinding and drilling, is outfitted with a stationary sensor, the driven tool, e.g., a saw blade, moving past this sensor so that a mark on the driven tool that is associated with the sensor can be sensed and data relating to this tool can be sent and processed by a control unit while working with the electric power tool to adjust the respective optimal operating parameters, particularly the rotational speed. The marks can be, for example, a sequence of projections, recesses, openings or contrasting color markings on the surface of the tool. The sensor can operate by optical, magnetic, inductive or capacitative sensing.

An example for the application of a transponder is found in DE 35 41 676 A1. A module having an electronically readable marking is arranged on the objects for general characterization and identification of objects, but particularly of equipment such as tools and workpiece carriers required in manufacturing processes. An evaluating device is provided with at least one receiver which reads the markings. Every module contains at least one oscillating circuit for generating a resonant frequency combination or frequency combination characteristic for it. The modules arranged on the object are selected in accordance with the elements required for indicating the identification of the object in the selected code. A pocket bore hole on the shaft of a tool, for example, can be associated with every module to hold the module.

Also, U.S. Pat. No. 4,742,470 describes a transponder which is arranged at a tool to be identified in an automated machine tool system and which can be interrogated by a receiver. An intended field of application is in machine tools which are digitally controlled by computers, known as CNC machines, and which have access to tools that are accommodated in a cartridge and have a standardized tool shaft. The machines can automatically remove the required tool from the cartridge and insert it into the drive spindle enabling programmed machining of a large number of different parts without the input of an operator. The transponder is interrogated by a receiver which preferably has read/write capabilities. The transponder to which signals are supplied sends the information contained in memory back to the receiver.

In principle, at least some of the known systems or methods briefly discussed above could also be used for automatically determining the diameter of a disk-shaped tool, particularly a saw blade. In every case, however, this would require additional devices, e.g., optical sensors, mechanical sensing devices or magnetic or electromechanical reading devices. Most of the known methods also require additional elements or specific modifications in the tools themselves.

SUMMARY OF THE INVENTION

It is the object of the invention to provide a method for the automatic determination of the diameter of a round disk-like tool, particularly a saw blade for an automatic wall saw, which does not require any arrangements on the tool itself and uses electronic devices which are generally already provided in the drive device anyway, particularly an existing computing unit in a CPU.

The invention first makes use of the idea and insight that the diameter of the tool, particularly the saw blade, can be deduced from the inertia of the tool. This relationship is illustrated by way of example in Table 1.

TABLE 1

| | Diameter [m] | | | | | | |
|---|---|---|---|---|---|---|---|
| | 1.2 | 1.4 | 1.6 | 1.8 | 2.0 | 2.2 | 2.4 |
| Inertia [kgm$^2$] | 5.59 | 10.36 | 17.68 | 28.32 | 43.16 | 63.19 | 89.49 |

The effect of even small changes in diameter on inertia is very pronounced and therefore, the deduction of the diameter is error-tolerant in principle.

The invention includes three alternative solutions. In a first solution, the invention applies the following method steps in a method for automatic determination of the diameter of a round disk-like tool driven by a motor, particularly a saw blade for an automatic wall saw:

the tool is driven with a motor torque $M_{Mot}$ with a sinusoidal shape with amplitude $M_{Mot}$ and with two defined measurement frequencies $f_1$ and $f_2$;

the amplitude of the rotational speed $\omega_R$ of the rotational speed $\omega_R$ of the motor is measured or the amplitude $M_G$ of the torque in the gear unit is measured;

the inertia $\Theta_s$ of the tool is calculated based on a mathematical model using variables $M_{Mot}$, $\omega_R$, $f_1$, $f_2$ and $M_G$ and the known or previously determined inertia $\Theta_R$ of the tool drive; and then the tool diameter is determined from a given comparison table, for which Table 1 may serve as an example, or from a comparison curve of a graph showing the relationship of tool inertia $\Theta_s$ to tool diameter.

Before the first method step, it is advantageous for an appreciable increase in accuracy to drive the tool at a constant exciting motor torque $M_{Mot0}$ which is selected such that the tool rotates at a constant rotational speed $\omega_{RO}$, whereupon the tool friction $d_s$ is determined according to the following equation:

$$d_S = \frac{M_{Mot0} - d_R \cdot w_{RO}}{\omega_{RO}},$$

where $d_R$ is the known or previously determined friction in the drivetrain from the motor to the tool at the rotational speed $\omega_{RO}$.

Another advantageous possibility for taking into account the tool friction consists in measuring the torque $M_{G0}$ in the drivetrain from the motor to the tool before beginning the first method step for determining the tool inertia; the tool is driven with constant torque $M_{Mot0}$ which is selected such that the tool rotates at a constant rotational speed $\omega_{RO}$. The tool friction is then determined according to the following equation:

$$d_S = d_R \cdot \frac{M_{G0}}{M_{Mot} - M_{G0}},$$

where $d_R$ is again the known or previously determined friction in the drivetrain from the motor to the tool at rotational speed $\omega_{RO}$.

In a second variant solution for the method for the automatic determination of the diameter of a round disk-shaped tool driven by a motor according to the invention, the following method steps are applied:

the tool is accelerated with a defined, constant torque $M_{Mot}$; and the curve $\omega(t)$ of the rotational speed over time is recorded, e.g., in sufficiently small increments in an electronic storage or memory; and then an end value $\overline{\omega}_{end}$ of the rotational speed corresponding to the torque $M_{Mot}$ is determined and the coefficient of friction is determined from $$d_{tot} = \frac{M_{Mot}}{\overline{\omega}_{end}},$$

and the time $\tau$ period from the start of the motor acceleration until reaching the fraction $(1-\underline{e^{-1}})$ =63.21% of the end value of the rotational speed $\overline{\omega}_{end}$ is determined, and then the inertia of the tool is determined according to the following equation:

$$\Theta_S = \tau \cdot d_{tot} \cdot \Theta_R,$$

where $\Theta_R$ designates the known or previously determined inertia of the drive, i.e., of the rotor of the drive motor and possibly of the gear unit.

The tool diameter is then determined from the calculated inertia of the tool using a given comparison table or comparison curve representing the relationship of the tool inertia $\Theta_S$ to the tool diameter.

It is advantageous to determine the time or time period t particularly at a determined fraction of the rotational speed value, namely, at a fraction $(1-e^{-1})$, that is, at 63.2%, of the end value of the rotational speed; the calculation formula is particularly simple.

According to a third basic constructional variant of the method for the automatic determination of the diameter of a round disk-like tool driven by a motor, particularly a saw blade for an automatic wall saw, according to the invention, the following method steps are provided:

the tool is initially accelerated with a defined, constant torque $M_{Mot}$;

the curve $\omega(t_n)$ of the rotational speed over time is recorded in small increments, particularly in a memory, until a constant rotational speed $\omega_{end}$ is reached;

a coefficient of friction is calculated with the following equation:

$$\overline{d}_{tot} = \frac{M_{Mot}}{\overline{\omega}_{end}},$$

where $\overline{\omega}_{end}$ corresponds to the average rotational speed for the last, e.g., 3 to 30, data points of the recording of the rotational speed curve, where $$\overline{\omega}_{end} = \frac{1}{(n_{end} - n_0)} \sum_{k=n_0}^{n_{end}} \omega_k,$$

where $n = n_0, n_1, \ldots, n_{end}$ for $t > t_{n0}$ and $\omega_n = \omega_{end}$; then the time constant $\tau$ of the slope of the rotational speed curve for the values before the last data points is determined; and the inertia of the tool is calculated with the following formula:

$$\Theta_S = \tau \cdot \overline{d}_{tot} \cdot \Theta_R,$$

where $\Theta_R$ designates the known or previously determined inertia of the drive;

the tool diameter is determined from a given comparison table or comparison curve of the relationship of tool inertia $\Theta_S$ to tool diameter.

The time increments of the rotational speed curve are selected, for example, at an interval of 50 to 500 ms, i.e., with 20 to 200 values per recording process.

BRIEF DESCRIPTION OF THE INVENTION

Figure 2A:
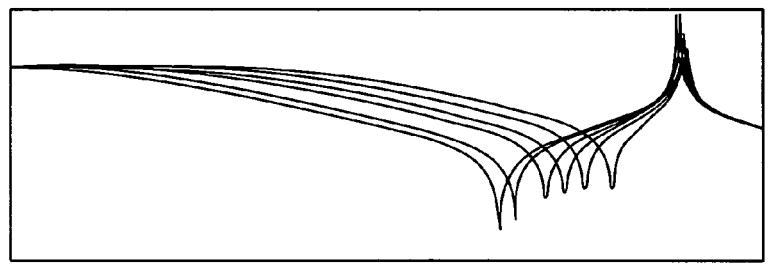
Figure 3A:
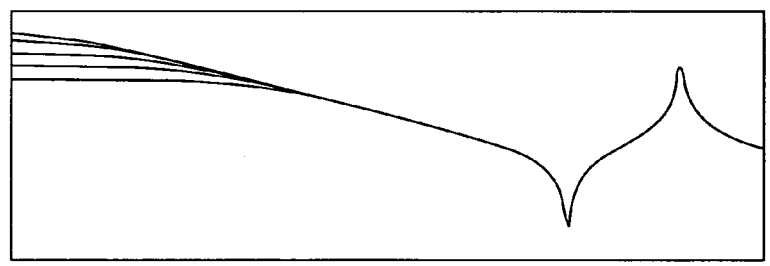
Figure 4A:
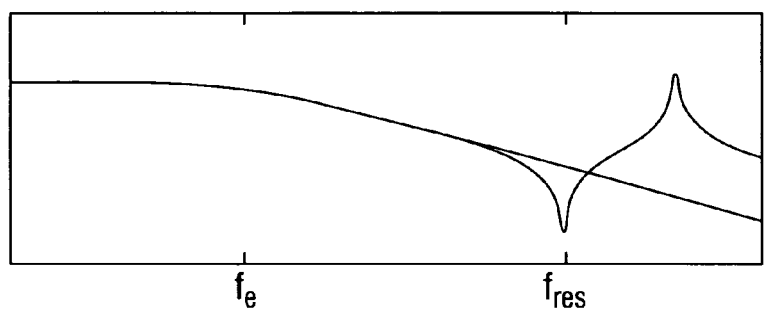
Figure 5A:
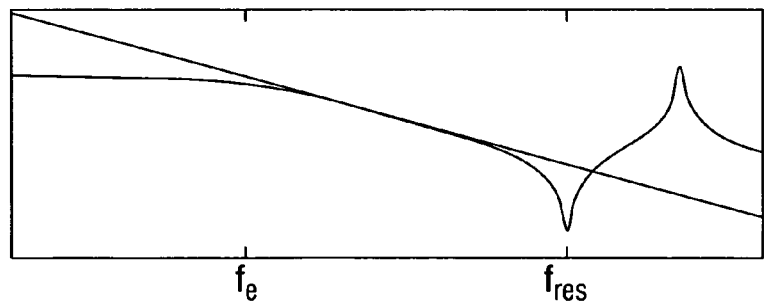
Figure 6:
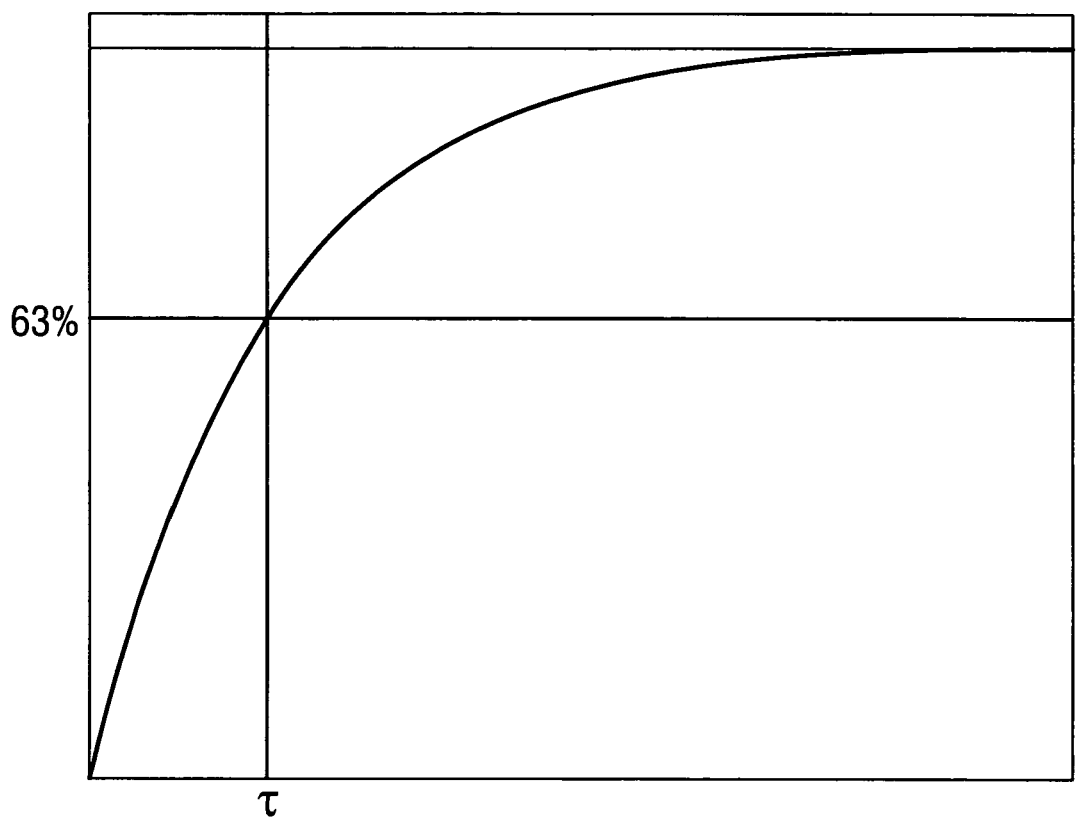
Figure 7:
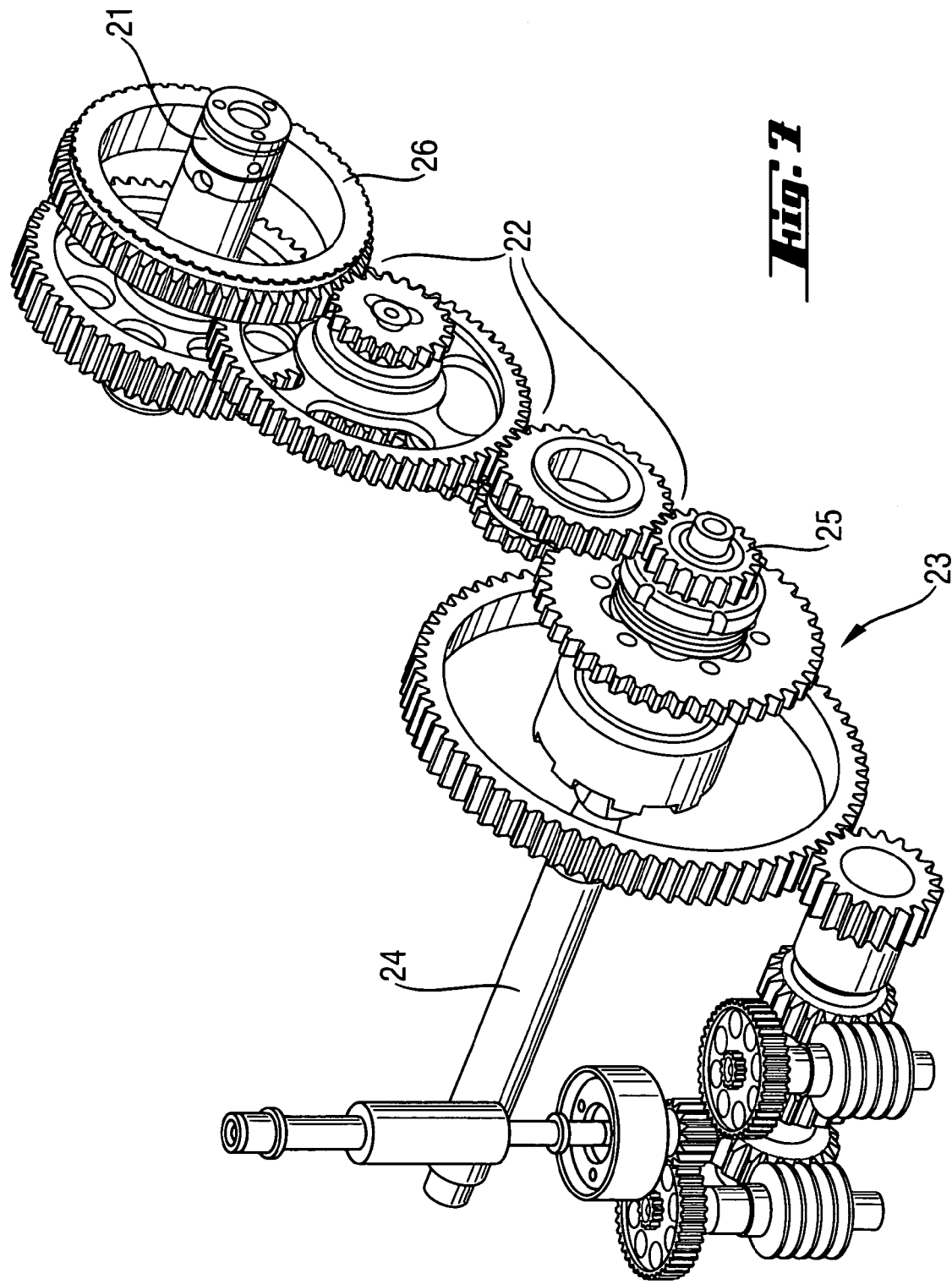

The invention and advantageous details will be described with reference to the drawings, wherein:

FIG. 1 shows a schematic model of a tool, particularly a saw blade drive, as a dual-mass oscillator according to the invention;

FIGS. 2A and B show typical curves of a Bode plot of the amplification and phase as a function of frequency (rotational speed) for different tool diameters according to the invention;

FIGS. 3A and B show typical curves of a Bode plot of amplification and phase as a function of frequency for different frictions according to the invention;

FIGS. 4A and B show the comparison of the Bode plots of amplification and phase using a first simplification according to the invention;

FIGS. 5A and B show the comparison of the Bode plots of amplification and phase using a simplified model according to the invention;

FIG. 6 is a graph showing the acceleration curve in determining the tool inertia according to the second basic solution variant of the invention; and FIG. 7 is an isometric drawing of the basic construction of a saw blade drive for a wall saw.

DETAILED DESCRIPTION OF THE INVENTION

As a starting point for explaining the invention, a saw blade drive of a wall saw serving as an example of the device will first be discussed briefly with reference to FIG. 7.

The saw blade drive comprises a motor (not shown) which acts, via its motor shaft 24, on a planetary gear unit 23 and on a three-step spur gear unit 22 following the latter. Shafts (not shown in more detail) are installed as transmission members respectively between the motor and the planetary gear unit 23, between the planetary gear unit 23 and the first spur gear 25, and between the final spur gear 26 and the saw blade. The saw blade, not shown, is arranged on an outwardly projecting end 21 of the final shaft of the drivetrain in an exchangeable manner.

FIG. 1 shows a possible model of a saw blade drive as a dual-mass oscillator. The drivetrain shown in FIG. 7 is thought of as divided in the center, particularly at the point of greatest elasticity. The inertial masses are comprised at two discrete points as mass 10 and mass 12. The elasticity of the shafts and gears is likewise comprised in one point and results in a torsion spring 14. A friction, designated by 15, or a frictional value $d_R$ in the drivetrain and a friction, designated by 16, or frictional value $d_S$ at the tool, namely, in particular, at the saw blade, must also be taken into account. These frictions act on the two inertial masses 10 and 12.

The dominant inertial masses will be those of the rotor of the motor $\Theta_R$ and of the tool, particularly of the saw blade $\Theta_{saw\ blade}$ or $\Theta_S$. The dominant elasticity will be that of the shaft between the final gear unit stage and the saw blade. This model can be described by the following system equation:

$$\frac{d}{dt}\begin{bmatrix}\varphi(t)\\\omega_R(t)\\\omega_S(t)\end{bmatrix} = \begin{bmatrix}0 & 1 & -1\\-c_a/\Theta_R & d_R/\Theta_R & 0\\c_a/\Theta_S & 0 & -d_S/\Theta_S\end{bmatrix} \cdot \begin{bmatrix}\varphi(t)\\\omega_R(t)\\\omega_S(t)\end{bmatrix} + \begin{bmatrix}0\\1/\Theta_R\\0\end{bmatrix} \cdot M_{Mot}(t) \quad (1)$$

$$\begin{bmatrix}M_G(t)\\\omega_R(t)\end{bmatrix} = \begin{bmatrix}c_G & 0 & 0\\0 & 1 & 0\end{bmatrix} \cdot \begin{bmatrix}\varphi(t)\\\omega_R(t)\\\omega_S(t)\end{bmatrix}$$

The variables indicated in the system equation (1) represent the following:

| | |
|---|---|
| $\varphi(t)$ | angle of rotation as a function of time |
| $\omega_R(t)$ | rate of rotation or rotational speed of the rotor as a function of time |
| $\omega_S(t)$ | rate of rotation or rotational speed of the tool (saw blade) |
| $c_G$ | rigidity of the gear unit |
| $\Theta_R$ | inertia of the rotor |
| $\Theta_S$ | inertia of the tool (saw blade) |
| $d_R$ | friction of the rotor, possibly plus the friction of the gear part to be associated with the rotor side |
| $d_S$ | friction of the tool (saw blade), possibly plus the friction of the gear unit to be associated with the tool side |
| $M_{Mot}(t)$ | motor torque as a function of time |
| $M_G(t)$ | gear torque as a function of time. |

The following is given as transfer function for the gear torque:

$$M_G(s) \frac{s\Theta_S c_G + d_S c_G}{s^3\Theta_R\Theta_S + s^2(\Theta_R d_S + \Theta_S d_R) + s(d_R d_S + c_G(\Theta_S + \Theta_R)) + c_G(d_S + d_R)} M_{Mot}(s) \quad (2)$$

The rotational speed of the rotor is given by:

$$\omega_R(s) \frac{s^2\Theta_S + s d_S + c_G}{s^3\Theta_R\Theta_S + s^2(\Theta_R d_S + \Theta_S d_R) + s(d_R d_S + c_G(\Theta_S + \Theta_R)) + c_G(d_S + d_R)} M_{Mot}(s) \quad (3)$$

In the transfer function according to Equations (2) and (3), $s=j2\pi f$, where f is the frequency at which the torque $M_{MOT}$ is changed.

The inertia $\Theta_S$ of the tool (saw blade) is dependent upon the tool diameter and is therefore unknown. Likewise unknown is the friction $d_S$ which acts on the tool, since the latter is free and therefore not exposed to any friction or is already highly loaded, for example, clamped in a saw slot.

Figure 2B:
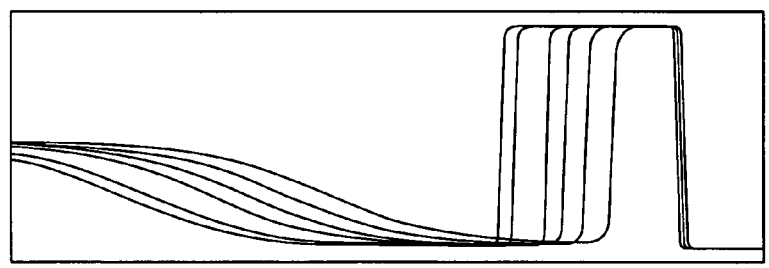
Figure 3B:
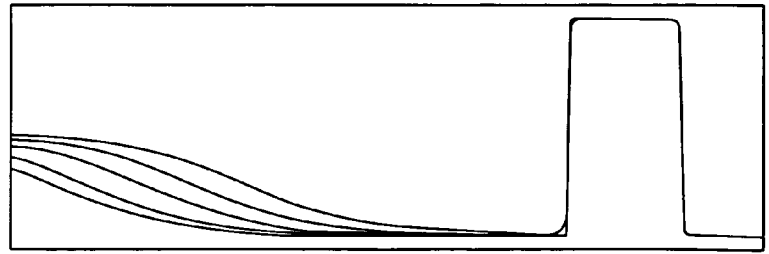

FIGS. 2 and 3 show typical curves for a Bode plot of the transfer function $M_{Mot} \rightarrow \omega_R$ for different tools, particularly for different saw blade diameters and frictions.

It is possible to determine the two unknown quantities $\Theta_R$ and $d_S$ by means of two measurements of $\omega_R$ and $M_G$ at two different frequencies $f_1$ and $f_2$ and at a given motor torque $M_{Mot}$. The calculation is carried out by substituting s by $j2\pi f_1$ and $j2\pi f_2$ in Equations (2) and (3) and solving the two resulting equations for $\Theta_S$ and $d_S$.

For the greatest possible tolerance with respect to measurement errors, it is advantageous to select one frequency as close as possible to 0 and to select the other frequency slightly before or close to the resonant frequency of the total system.

When the first frequency $f_1=0$ [Hz], i.e., s=0, the situation is particularly simple. The inertia of the tool $\Theta_S$ is no longer contained in Equations (2) and (3), so that they can be solved directly for the unknown friction of the tool $d_S$, i.e., $$(2) \rightarrow d_S = d_R \cdot \frac{M_{G0}}{M_{Mot0} - M_{G0}}, \text{ or}$$

$$(3) \rightarrow d_S = \frac{M_{Mot0} - d_R \cdot \omega_{R0}}{\omega_{R0}}, \text{ or – since } \omega_{R0} \text{ and } \omega_{S0} \text{ are identical –}$$

$$d_S = \frac{M_{Mot0} - d_R \cdot \omega_{S0}}{\omega_{S0}}$$

The excitation can be carried out with different values (amplitudes) for the motor torque to increase accuracy; then the results for ds are averaged.

A further simplification results when the gear unit is assumed to be rigid. The transfer function $M_{Mot} \to \omega_R$, i.e., Equation (3), is then simplified as follows:

$$\omega_R = \frac{1}{s(\Theta_R + \Theta_S) + d_R + d_S} M_{Mot} \quad (4)$$

or for absolute value $$|\omega_R| = \left|\frac{1}{s(\Theta_R + \Theta_S) + d_R + d_S}\right| \cdot M_{Mot} \quad (5)$$

Figure 4B:
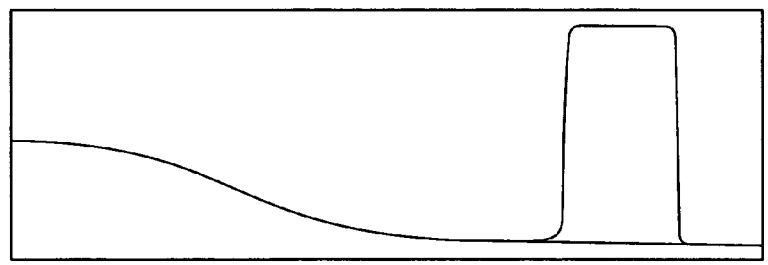

A comparison of the Bode plots of the original model with the simplified model is shown in FIG. 4. There is very good correspondence within a large area, i.e., when the excitation is carried out at a frequency appreciably below the resonant frequency (e.g., by a factor of 10), the simplified model according to Equations (4) and (5) can also be used. When s is replaced by $j2\pi f$ in Equation (5) and is solved for $\Theta_S$, this gives $$\Theta_S = \frac{-2\pi f \Theta_R |\omega_R| \pm \sqrt{-d_R^2 |\omega_R|^2 - 2 d_R d_S |\omega_R|^2 - d_S^2 |\omega_R|^2 + M_{Mot}^2}}{2\pi f |\omega_R|} \quad (6)$$

It can be clearly seen from FIG. 3 that the transfer function is independent from the frictions within an area appreciably above the limit frequency:

$$f_e = \frac{1}{2\pi} \frac{d_R + d_S}{\Theta_R + \Theta_S}.$$

The measurement frequency is then selected such that it is greater than the greatest occurring limit frequency. In this region, the transfer function can be described in a greatly simplified manner by $$|\omega_R| = \left|\frac{1}{s(\Theta_R + \Theta_S)}\right| \cdot |M_{Mot}| = \frac{1}{2\pi f(\Theta_R + \Theta_S)} \cdot |M_{Mot}| \quad (7)$$

Figure 5B:
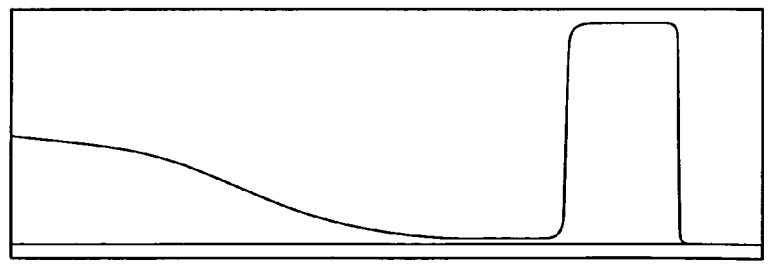

This is illustrated in FIG. 5. The tool inertia can then be determined in a particularly simple manner by $$\Theta_S = \frac{|M_{Mot}|}{|\omega_R|} \frac{1}{2\pi f} - \Theta_R \quad (8)$$

To summarize, this first variant of the invention can be characterized by the following method steps:

The tool is driven at a constant motor torque $M_{M.ot0}$ which is selected such that the tool or motor rotates at a constant rotational speed; this rotational speed is measured and the friction is determined according to $$d_S = \frac{M_{Mot0} - d_R \cdot \omega_{R0}}{\omega_{R0}}.$$

the tool (saw) is driven with a sinusoidal torque curve with amplitude $M_{Mot}$ and frequency $f_{Meas}$; the amplitude of the rotational speed $\omega_R$ is measured and the inertia of the tool $\Theta_S$ is determined according to $$\Theta_S = \frac{-2\pi f_{Meas} \Theta_R \hat{\omega}_R \pm \sqrt{-d_R^2 \hat{\omega}_R^2 - 2 d_R d_S \hat{\omega}_R^2 - d_S^2 \hat{\omega}_R^2 + \hat{M}_{Mot}^2}}{2\pi f_{Meas}};$$

when the limit frequency $f_e$ (see FIG. 5) and the resonant frequency $f_{res}$ are sufficiently far apart, the measurement can be carried out in this range, i.e., for $f_e \ll f_{Meas} \ll f_{res}$, and the tool inertia is determined in a very simple manner by A further simplification results when the gear unit is assumed to be rigid. The transfer function $M_{Mot} \to \omega_R$, i.e., Equation (3), is then simplified as follows:

$$\Theta_S = \frac{\hat{M}_{Mot}}{\hat{\omega}_R} \frac{1}{2\pi f_{Meas}} - \Theta_R$$

In this case, it is not necessary to determine the tool friction $d_S$ beforehand.

Instead of $\omega_R$, the torque $M_G$ in the gear unit can also be measured; then other equations apply, particularly $$d_S = d_R \cdot \frac{M_{G0}}{M_{Mot0} - M_{G0}};$$

instead of measurements at $f=f_0$ and $f=f_1$, it is also possible to measure at any other two frequencies which should lie appreciably below the resonant frequency.

Using the more general model, shown above with reference to Equations (1) to (3), it is also possible to measure at any two frequencies which should advantageously be in the vicinity of the resonant frequency.

Every measurement and calculation can be carried out with a plurality of values for the exciting torque and the resulting values for friction and tool inertia can be averaged to increase accuracy. This also applies in principle to the two other alternative variants of the invention that will be described in the following.

As a final step, the diameter of the tool can be deduced in a simple manner with knowledge of the inertia of the tool (saw blade), particularly by using an electronic table to bring about an optimized setting of the tool drive adapted to the tool diameter using this diameter value.

As basis for the second basic variant of the solution according to the invention, the tool drive, and particularly the wall saw drive, is described by a first order differential equation:

$$\frac{d}{d_t}\omega_R(t) = d_{tot}/(\Theta_R + \Theta_S) \cdot \omega_R(t) + 1/(\Theta_R + \Theta_S) \cdot M_{Mot}(t), \quad (9)$$

with motor torque $\omega_R$, friction $d_{tot}$ acting on the tool and the drive, inertia of the drive (motor and gear unit) $\Theta_R$, the inertia of the saw blade $\Theta_S$ and the motor torque $M_{Mot}$. All of the variables are converted with the transmission ratios on one side of the gear unit, e.g., on the motor side. This model is applicable under the permissible assumption that the transmission members are rigid.

When the motor is operated at constant torque, the differential equation (9) is solved by:

$$\omega_R = \frac{M_{Mot}}{d_{tot}}\left(1 - e^{\frac{t}{\tau}}\right) \quad (10)$$

$$\tau = \frac{\Theta_R + \Theta_S}{d_{tot}}$$

FIG. 6 shows the time curve of this acceleration process. The rotational speed $\omega(t)$ approaches an end value of $M_{Mot}/d_{tot}$ asymptotically.

After time $\tau$, a value if 63.21% is reached (see FIG. 6).

To summarize, the following method steps are carried out in this second basic constructional variant of the invention for the determination of the saw blade diameter:

the saw blade is accelerated at a defined and constant torque $M_{Mot}$;

the curve of the rotational speed ($\omega_R$) and the associated time in small time increments are registered, e.g, recorded, in memory;

the coefficient of the friction ($d_{tot}$) acting on the tool and the drive is calculated according to the following equation:

$$d_{tot} = \frac{M_{Mot}}{\text{measured end value of the rotational speed}};$$

time $\tau$ at which 63.21% of the end value of the rotational speed is reached is determined;

the inertia of the tool is calculated according to the following equation:

$$\Theta_S = \tau \cdot d_{tot} - \Theta_R;$$

the tool diameter associated with the calculated tool inertia is determined.

In the third basic constructional variant of the invention, a model is based on a linear regression. This method essentially comprises the following steps:

the tool is accelerated at a defined and constant torque $M_{Mot}$;

the curve of the rotational speed $\omega_n = \omega(t_n)$ and the associated time, preferably in sufficiently small time increments $t_n$, are recorded in memory;

when the rotational speed $\omega$ is constant, the data recording is terminated;

the final data points, e.g., the final 3 to 30 data points, are used for the calculation of the coefficient of friction $d_{tot}$ according to:

$$\overline{\omega}_{end} = \frac{1}{(n_0)} \sum_{k=n_0}^{n_{end}} \omega_k \text{ for } n = n_0...n_{end}(\text{for } t > t_0, \omega_n = \omega_{end}) \quad (11)$$

$$\overline{d}_{tot} = \frac{M_{Mot}}{\overline{\omega}_{end}} \quad (12)$$

The measured data pair for a time value $t_n$ or rotational speed value $\omega_n$ satisfies the following equations:

$$y_n = 1_n\left(1 - \frac{\omega_n}{\omega_{end}}\right) = \frac{-t_n}{\tau} = m \cdot x_n \quad (13)$$

This equation represents a straight line through the origin of Cartesian coordinate axes with abscissa x and ordinate y with the slope $$m = \frac{-1}{\tau}.$$

The slope of this straight line and the time constant $\tau$ and the moment of inertia and, therefore, the radius of the tool can be determined by a linear regression:

$$m = \frac{-1}{\tau} = \frac{\sum x_n \cdot y_n}{\sum (x_n)^2} \quad (14)$$

$$\overline{\Theta_R + \Theta_S} = \overline{\tau \cdot d_{tot}} \quad (15)$$

An automatic determination of the inertia of a disk-shaped tool, particularly a saw blade for an automatic wall saw and a determination of the diameter can be achieved in a simple manner without additional expenditure on hardware by the invention which was illustrated with reference to the three constructional variants. In this way, the tool drive can be optimized for a selected tool in an automatic adjusting process. In particular, when the invention is applied in wall saws, the cut length and cut depth can be easily determined in a simple manner.

What is claimed is:

1. A method for the automatic determination of the diameter of a round disk-like tool driven by a motor such as a saw blade for an automatic wall saw, comprising the following method steps:

(a) driving the tool with a motor torque $M_{Mot}$ with a sinusoidal shape with amplitude $M_{Mot}$ and with two defined measurement frequencies $f_1$ and $f_2$;

(b) measuring one of the amplitude $\omega_R$ of the rotor speed $\omega_R$ of the motor and the amplitude of the gear unit torque $M_G$;

(c) calculating the inertia $\Theta_S$ of the tool based on a mathematical model using variables $M_{Mot}$, $\omega_R$, $f_1$, $f_2$ and $M_G$ and the previously determined inertia $\Theta_R$ of the tool drive; and (d) determining the tool diameter from one of a given comparison table and comparison curve of a graph showing the relationship of tool inertia $\Theta_S$ to tool diameter.

2. The method of claim 1, further comprising the steps of:

(e) before the first method step (a), driving the tool at a constant exciting motor torque $M_{Mot0}$ selected such that the tool rotates at a constant rotational speed $\omega_{RO}$, (d) determining the tool friction $d_S$ according to the equation:

$$d_S = \frac{M_{Mot0} - d_R \cdot w_{RO}}{\omega_{RO}},$$

where $d_R$ is one of the known and previously determined friction in the drivetrain from the motor to the tool at motor speed $\omega_{RO}$.

3. The method of claim 2, wherein step (c) further comprises the step of calculating the tool inertia $\Theta_S$ by the equation $$\Theta_S = \frac{-2\pi f_{Meas} \Theta_R \hat{\omega}_R \pm \sqrt{-d_R^2 \hat{\omega}_R^2 - 2 d_R d_S \hat{\omega}_R^2 - d_S^2 \hat{\omega}_R^2 + \hat{M}_{Mot}^2}}{2\pi f_{Meas}}.$$

4. The method of claim 2, comprising the step of carrying out the determination of the tool friction $d_S$ multiple times with different values of the exciting motor torque $M_{Mot0}$ to increase accuracy, and averaging the obtained values.

5. The method of claim 1, further comprising the steps of:

(e) before the first method step (a), measuring the torque $M_{G0}$ in the drivetrain from the motor to the tool, wherein the tool is driven at a constant motor torque $M_{Mot}$ selected such that the tool rotates at a constant rotational speed $\omega_{RO}$;

(g) determining the tool friction according to the equation:

$$d_S = d_R \cdot \frac{M_{G0}}{M_{Mot} - M_{G0}},$$

where $d_R$ is one of the known and previously determined friction in the drivetrain from the motor to the tool at rotational speed $\omega_{RO}$.

6. The method of claim 1, further comprising the step of selecting the measurement frequencies $f_{Meas}$ within a frequency range located appreciably above a limit frequency $f_e$ defined by the friction and the inertia of the total system and appreciably below the resonant frequency $f_{res}$ of the total system, i.e., $f_e \ll f_{Meas} \ll f_{res}$, and wherein step (c) further comprises the step of calculating the tool inertia by the equation $$\Theta_S = \frac{\hat{M}_{Mot}}{\hat{\omega}_R} \frac{1}{2\pi f_{Meas}} - \Theta_R.$$

7. The method of claim 6, comprising the step of determining the limit frequency by the equation $$f_e = \frac{1}{2\pi} \frac{d_R + d_S}{\Theta_R + \Theta_S}.$$

8. A method for the automatic determination of the diameter of a round disk-shaped tool driven by a motor such as a saw blade for an automatic wall saw, comprising the steps of:

(a) accelerating the tool with a defined, constant torque $M_{Mot}$;

(b) recording the curve $\omega(t)$ of the rotational speed over time;

(c) determining an end value $\overline{\omega}_{end}$ of the rotational speed corresponding to the torque $M_{Mot}$ and calculating the coefficient of friction $$d_{tot} = \frac{M_{Mot}}{\overline{\omega}_{end}},$$

(d) determining the time $\tau$ period from the start of the motor acceleration until reaching the $(1-e^{-1})$ fraction of the end value of the rotational speed $\omega_{end}$;

(e) determining the inertia of the tool according to the equation $$\Theta_S = \tau \cdot d_{tot} \cdot \Theta_R,$$

where $\Theta_R$ designates one of the known and previously determined inertia of the rotor of the drive motor including the gear unit; and (f) determining the tool diameter from one of a given comparison table and comparison curve of the relationship of the tool inertia $\Theta_S$ to the tool diameter.

9. The method of claim 8, comprising the step of recording the rotational speed curve over time in memory in increments $\omega_n = w(t_n)$; $n = 0, 1, 2, 3, \ldots$ 10. A method for the automatic determination of the diameter of a round disk-shaped tool driven by a motor such as a saw blade for an automatic wall saw, comprising the steps of:

(a) accelerating the tool with a defined, constant torque $M_{Mot}$;

(b) recording the curve $\omega(t_n)$ of the rotational speed over time in small time increments until a constant rotational speed $\omega_{end}$ is reached;

(c) calculating a coefficient of friction with the equation:

$$\overline{d}_{tot} = \frac{M_{Mot}}{\overline{\omega}_{end}},$$

where $\overline{\omega}_{end}$ corresponds to the average rotational speed for the last data points of the recording of the rotational speed curve, where $$\overline{\omega}_{end} = \frac{1}{(n_{end} - n_0)} \sum_{k=n_O}^{n_{end}} \omega_k,$$

where $n=n_0, n_1, \ldots, n_{end}$ for $t>t_{n0}$ and $\omega_n=\overline{\omega}_{end}$;

(d) determining the time constant $\tau$ of the slope of the rotational speed curve for the data points before the last data points used for determining the coefficient of friction $\overline{d}_{tot}$;

(e) calculating the inertia of the tool by the following formula:

$$\Theta_S = \tau \cdot \overline{d}_{tot} \cdot \Theta_R,$$

where $\Theta_R$ designates one of the known and previously determined inertia of one of the rotor and the drive motor including the gear unit; and (f) determining the tool diameter from one of a given comparison table and comparison curve of the relationship of tool inertia $\Theta_S$ to tool diameter.

11. A device for a wall saw for determining the saw blade diameter wherein:

(a) a tool is driven with a motor torque $M_{Mot}$ with a sinusoidal shape with amplitude $M_{Mot}$ and with two defined measurement frequencies $f_1$, and $f_2$;

(b) an amplitude $\omega_R$ of the rotor speed $\omega_R$ of the motor is measured or the amplitude of the gear unit torque $M_G$ is measured;

(c) an inertia $\Theta_S$ of the tool is calculated based on a mathematical model using variables $M_{Mot}$, $\omega_R$, $f_1$, $f_2$ and $M_G$ and the known or previously determined inertia $\Theta_R$ of the tool drive; and (d) the tool diameter is determined from one of a given comparison table and a comparison curve of a graph showing the relationship of tool inertia $\Theta_S$ to tool diameter.

* * * * *